US010448356B1

(12) United States Patent
Do et al.

(10) Patent No.: US 10,448,356 B1
(45) Date of Patent: Oct. 15, 2019

(54) MOBILE DEVICE LOCATION ANOMALY DETECTION BASED ON NON-LOCATION INFORMATION

(71) Applicant: Avast Software s.r.o., Prague (CZ)

(72) Inventors: Juyong Do, Cupertino, CA (US); Rajarshi Gupta, Los Altos, CA (US); Leo H. Kwong, El Cerrito, CA (US)

(73) Assignee: AVAST SOFTWARE S.R.O., Prague (CH)

( * ) Notice: Subject to any disclaimer, the term of this patent is extended or adjusted under 35 U.S.C. 154(b) by 0 days.

(21) Appl. No.: 16/370,958

(22) Filed: Mar. 30, 2019

Related U.S. Application Data (60) Provisional application No. 62/650,993, filed on Mar. 30, 2018.

(51) Int. Cl.
*H04W 8/24* (2009.01)
*H04W 64/00* (2009.01)
*H04W 4/029* (2018.01)
*H04B 17/318* (2015.01)

(52) U.S. Cl.
CPC ........ *H04W 64/003* (2013.01); *H04B 17/318* (2015.01); *H04W 4/029* (2018.02); *H04W 8/24* (2013.01)

(58) Field of Classification Search
CPC .................................................. H04W 64/003
See application file for complete search history.

(56) References Cited

U.S. PATENT DOCUMENTS

| 10,347,122 | B2 * | 7/2019 | Takenaka | G08G 1/0129 |
| 2016/0286351 | A1 * | 9/2016 | Glenn, III | H04W 4/023 |
| 2016/0379484 | A1 * | 12/2016 | Kashiwai | G08G 1/0112 340/933 |

* cited by examiner

*Primary Examiner* — Michael T Vu
(74) *Attorney, Agent, or Firm* — Husch Blackwell LLP (57) ABSTRACT

A location anomaly for a mobile device can be detected using non-location information from the mobile device. The non-location information does not include data from a location based device, such as a GPS. A probabilistic model is created using historical non-location information accumulated from the mobile device. Current non-location data is compared with the probabilistic model to determine a probability associated with the current non-location information. If the probability is less than a predetermined or configurable threshold, a location anomaly is detected. A notification of the location anomaly may be displayed and/or transmitted in response to detecting the location anomaly.

20 Claims, 4 Drawing Sheets

MOBILE DEVICE LOCATION ANOMALY DETECTION BASED ON NON-LOCATION INFORMATION

CROSS-REFERENCE TO RELATED APPLICATIONS

This Application claims priority to U.S. Provisional Patent Application Ser. No. 62/650,993, filed on Mar. 30, 2018, entitled "LOCATION ANOMALY DETECTION BASED ON NON-LOCATION INFORMATION," the entire disclosure of which is incorporated herein by reference.

FIELD

The disclosure relates generally to mobile devices, and more particularly, to detecting a location anomaly of a mobile device based on non-location information.

BACKGROUND

Since their introduction, the use of mobile telephones and other mobile computing devices has grown to the point where such devices are almost ubiquitous. In some instances, a first party may desire to know the physical location of a second party and a location of a mobile device assigned to the second party can be used as a proxy for the location of the second party. For example, many parents have provided mobile phones for their children to use. Parents often desire to know where their children or other family members are, and applications have been developed that allow parents to know the location of their children using location based information, such as location information from a Global Positioning System (GPS), on their child's phone. However, there can be disadvantages to relying on location-based data. For example, in order to protect the privacy of the child, the parents or the child may turn location based services on the child's phone off. Alternatively, the child may purposely turn off the location based services of their phone in order avoid parents tracking their location. Further, location-based services may not work in buildings or other structures when a GPS signal is not available. Also, location-based services consume a relatively large amount of power on a mobile device.

SUMMARY

Systems and methods enable detecting an anomalous location of a mobile device by (i) receiving current non-location information from the mobile device at a current time, wherein the current non-location information does not include location information from the mobile device; (ii) comparing the current non-location information with a probabilistic model, wherein the probabilistic model is created using historical non-location information for the mobile device, wherein the historical non-location information does not include location information from the mobile device; and (iii) generating a location anomaly indication indicating that the mobile device is in a location that is anomalous at the current time in response to determining, based on the comparison, that the current non-location information is indicative of a location of the mobile device having a probability at the current time less than a threshold probability.

BRIEF DESCRIPTION OF THE DRAWINGS

For a better understanding of the inventive subject matter, reference may be made to the accompanying drawings in which.

DETAILED DESCRIPTION

In the following detailed description of example embodiments, reference is made to the accompanying drawings that form a part hereof, and in which is shown by way of illustration specific example embodiments in which the inventive subject matter may be practiced. These embodiments are described in sufficient detail to enable those skilled in the art to practice the inventive subject matter, and it is to be understood that other embodiments may be utilized and that logical, mechanical, electrical and other changes may be made without departing from the scope of the inventive subject matter.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

The description of the various embodiments is to be construed as examples only and does not describe every possible instance of the inventive subject matter. Numerous alternatives could be implemented, using combinations of current or future technologies, which would still fall within the scope of the claims. The following detailed description is, therefore, not to be taken in a limiting sense, and the scope of the inventive subject matter is defined only by the appended claims.

A location anomaly service can utilize non-location data to determine probabilistic models describing mobile device environments over time. The service or other application can use the probabilistic models to compare a current environment of a mobile device, as determined from non-location information, with one or more environments predicted by the probabilistic model. If the determined current environment of the mobile device is not one or more predicted environments, then an anomaly can be detected based on the non-location information.

Figure 1A:
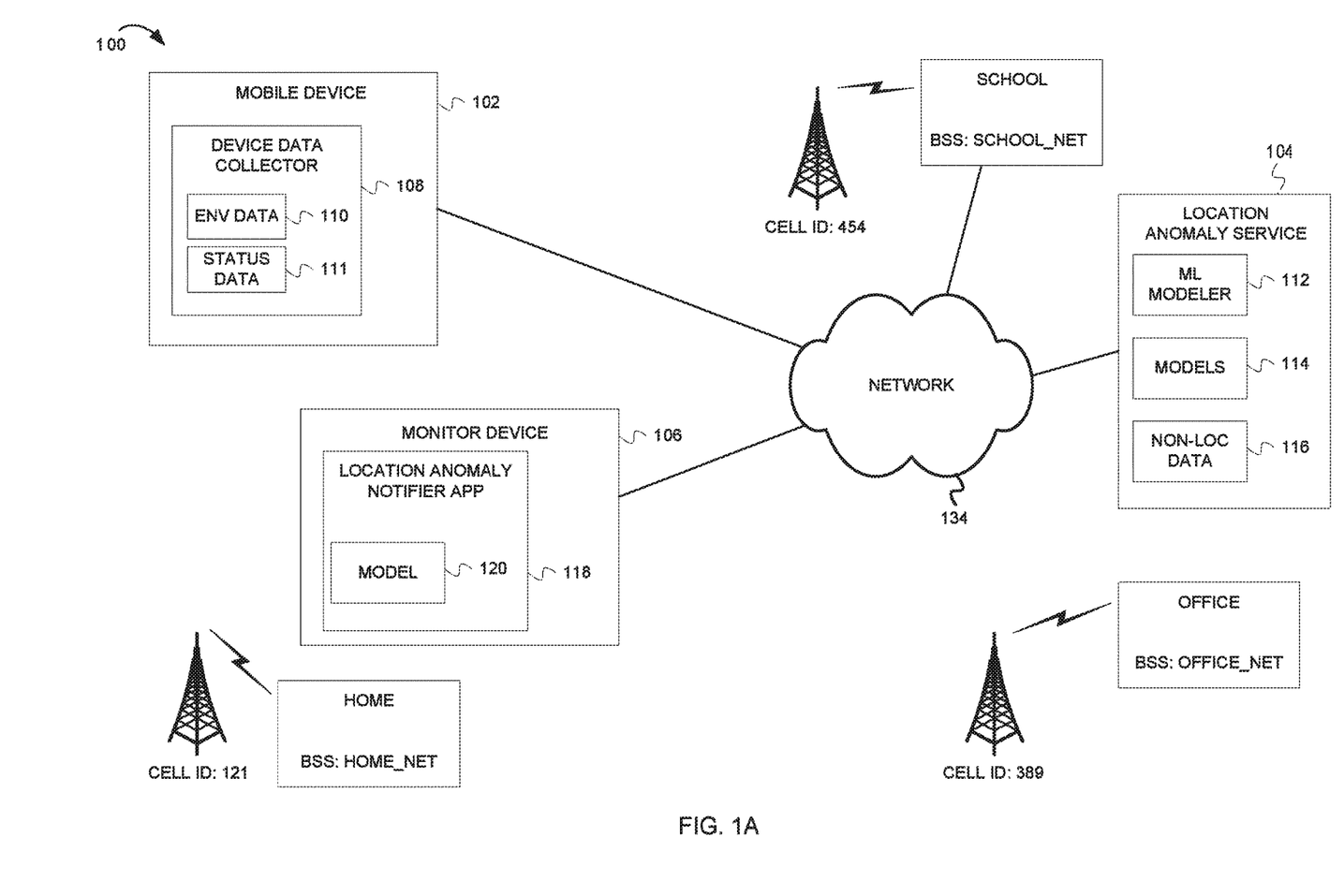
FIG. 1A is a block diagram of a system to detect location anomalies of mobile devices based on non-location information in accordance with one embodiment of the present invention.

FIG. 1A is a block diagram of a system 100 to detect location anomalies of mobile devices based on non-location information obtained from various sources on the mobile devices. In some aspects, system 100 includes a mobile device 102, a location anomaly service 104, and a monitor device 106 coupled via a network 134. Network 134 can be a network maintained by a cellular phone service provider such as a LTE or WCDMA network, for example. Alternatively, network 134 can be a combination of one or more wired or wireless networks. For example, network 134 can be one or more networks that make up the Internet. Although the geographic scale/spatial scope of network 134 is not limited, examples of networks that can comprise network 134 include, but are not limited to, a backbone network, a metropolitan area network (MAN), a wide area network (WAN), a global area network (GAN), a public switched telephone network (PSTN), and an Internet area network (IAN). In another embodiment, network 134 includes any medium that allows data to be physically transferred through serial or parallel communication channels (e.g., copper wire, optical fiber, computer bus, wireless communication channels, etc.).

A mobile device 102 can be a smartphone, tablet device, laptop computer, or other device that is capable of providing non-location based information and/or for which non-location based information can be derived. The example system 100 illustrated in FIG. 1A shows one mobile device. Those of skill in the art having the benefit of the disclosure will appreciate that there may be more than one mobile device 102 in the system.

Mobile device 102 can include data collector 108. Data collector 108 obtains environment data 110 and status data 111 from various sources on the mobile device 102 regarding a current operational environment for the mobile device 102. In some embodiments, data collector 108 is provided as processor-executable instructions that comprise a function, a routine, a method, and/or a subprogram stored on a machine-readable medium of mobile device 102. The environment data 110 and status data 111 includes data other than location based data. For the purposes of this application, location based data is data that directly identifies a location for the mobile device 102, such as longitude and latitude data provided via a GPS system, for example. Thus, environment data 110 is non-location based data that does not include longitude and latitude data for the mobile device 102. In some embodiments, environment data 110 can include various combinations of one or more of a serving cell identifier (e.g., CELL ID 121, etc.), a signal strength of the serving cell, an interface type of the serving cell (e.g., long-term evolution (LTE), wide band code division multiple access (WCDMA), etc.), neighboring cell identifiers, signal strengths of the neighboring cells, interface types of the neighboring cells, an identifier of a base station subsystem (e.g., BSS: HOME NET, etc.), medium access control (MAC) sublayer address (e.g., Wi-Fi® and/or Bluetooth® MAC address, etc.), service set identifiers (SSID) (e.g., Wi-Fi® and/or Bluetooth® SSID, etc.), received signal strength indication (RSSI) in a radio signal (e.g., Wi-Fi® and/or Bluetooth® signal, etc.) received by the mobile device 102, and the like. In some embodiments, environment data 110 is comprised of values stored in a machine-readable medium of mobile device 102. The environment data 110 may be stored as one or more types (e.g., real, integer, Boolean, numbers, strings, etc.) and/or organized in one or more data structures (e.g., arrays, linked lists, records, unions, objects, graphs, binary trees, etc.) on the machine-readable medium.

Status data 111 can include direct status information and derived status information. Direct status information can include raw sensor measurements from auxiliary devices on mobile device 102 such as a magnetometer, gyroscope, accelerometer, light sensor, image data from a camera, and the like. Direct status information can also include a list of active applications (i.e., foreground applications) executing on the mobile device 102. Derived status information can include information that is derived from sensor measurements. For example, derived status information can include whether the user is driving, walking, or sitting based on gyroscope and/or accelerometer data. Additionally, the derived status information can include whether the user is indoors or outdoors based on light sensor and/or image data captures from a camera. In some embodiments, status data 111 is comprised of values stored in a machine-readable medium of mobile device 102. The status data 111 may be stored as one or more types (e.g., real, integer, Boolean, numbers, strings, etc.) and/or organized in one or more data structures (e.g., arrays, linked lists, records, unions, objects, graphs, binary trees, etc.) on the machine-readable medium.

Mobile device 102 can periodically transmit the environment data 110 and/or status data 111 to location anomaly service 104, which can store the transmitted data as non-location based data 116. In some embodiments, mobile device 102 can transmit the data at a predetermined or configurable time interval, such as every 15 minutes. In alternative embodiments, mobile device 102 can transmit the data upon the occurrence of an event, such as a change in the cell ID or SSID. In further alternative embodiments, the data can be transmitted based on a combination of a time interval and event. In an embodiment, the mobile device 102 transmits the data to the location anomaly service 104 via the network 134. In some embodiments, non-location based data 116 is comprised of values stored in a machine-readable medium of one or more computing devices on which location anomaly service 104 is executing. The non-location based data 116 may be stored as one or more types (e.g., real, integer, Boolean, numbers, strings, etc.) and/or organized in one or more data structures (e.g., arrays, linked lists, records, unions, objects, graphs, binary trees, etc.) on the machine-readable medium.

Location anomaly service 104 can include a machine-learning modeler 112 that can produce one or more probabilistic models 114 based on the non-location data 116 received from mobile device 102. The probabilistic models 114 can provide probability data that the mobile device 102 is in an environment and/or has a particular status at various points in time. In some embodiments, location anomaly service 104, including machine-learning modeler 112, is provided as processor-executable instructions that comprise a function, a routine, a method, and/or a subprogram stored on a machine-readable medium of one or more computing devices (e.g., server computing devices, etc.). In some embodiments, probabilistic models 114 are comprised of values stored in a machine-readable medium of one or more computing devices on which location anomaly service 104 is executing. The probabilistic models 114 may be stored as one or more types (e.g., real, integer, Boolean, numbers, strings, etc.) and/or organized in one or more data structures (e.g., arrays, linked lists, records, unions, objects, graphs, binary trees, etc.) on the machine-readable medium.

Monitor device 106 can be any type of computing device. For example, monitor device 106 can be a smartphone of a parent or other party that wishes to be informed when a location anomaly is detected with respect to a mobile device 102. However, monitor device 106 can be another type of computing devices such as a laptop computer, desktop computer, tablet computer, server computer, set top box, video game console, or the like.

Monitor device 106 can execute a location anomaly notifier application 118. Location anomaly notifier application 118 provides notifications on the monitor device 106 when a location anomaly is detected for mobile device 102. In some embodiments, location anomaly notifier application 118 can receive a model 120 from location anomaly service 104, and use the model 120 to determine whether or not a location anomaly is detected with respect to mobile device 102. In such embodiments, the monitor device 106 receives the non-location data 116 from the location anomaly service 104. In alternative embodiments, monitor device 106 does not receive any models from location anomaly service 104. In such embodiments, location anomaly service 104 uses models 114 to detect a location anomaly for a mobile device 102 and pushes (e.g., transmits via network 134, etc.) the notification to location anomaly notifier application 118 in response to detecting the location anomaly. In further alternative embodiments, the operations of model building based on historical (e.g., accumulated) non-location data 116 and anomaly detection based on models (e.g., models 114, model 120, etc.) and current non-location data 116 are shared between location anomaly service 104 (e.g., executing on a server computing device, etc.) and monitor device 106. In such embodiments, the non-location data 116 is fed to the entity (e.g., service, device, etc.) where model building and mode inference is executed. In some embodiments, notifier application 118 is provided as processor-executable instructions that comprise a function, a routine, a method, and/or a subprogram stored on a machine-readable medium of monitor device 106.

It should be noted that while that FIG. 1A shows the location anomaly service 104 and monitor device 106 as separate entities, the functionality provided by the location anomaly service 104 could be integrated with the location anomaly notifier application 118 such that monitor device 106 both performs the modeling and detects location anomalies based on non-location data.

Figure 1B:
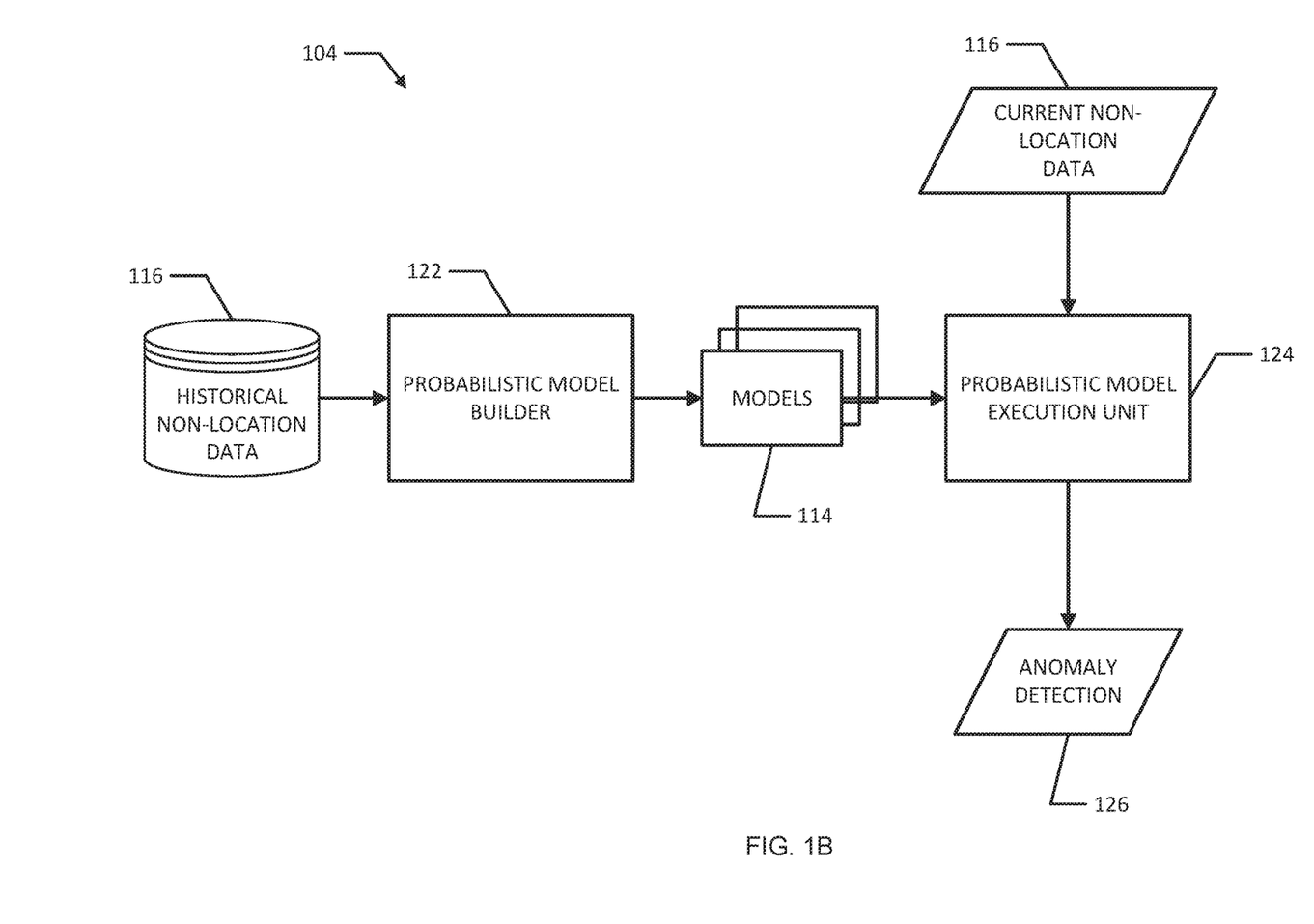
FIG. 1B is a block diagram of a location anomaly service of the system of FIG. 1A in accordance with one embodiment of the present invention.

FIG. 1B is a block diagram of an exemplary embodiment of location anomaly service 104. In this embodiment, location anomaly service 104 includes a probabilistic model builder 122 and a probabilistic model execution unit 124, which comprise the machine-learning modeler 112. The location anomaly service 104 accesses historical non-location data 116 and executes the probabilistic model builder 122 to create one or more probabilistic models 114. The probabilistic model builder 122 may be executed only once to build probabilistic models 114 based on the historical non-location data 116. However, the probabilistic model builder 122 may be subsequently executed to update probabilistic models 114 when necessitated by changes in the historical non-location data 116. Each probabilistic model 114 includes a sample space (i.e., a set of all possible environment states) and a probability assigned to each element of the sample space. For example, a sample space may include the states "at school," "not at school," "driving," "sleeping," and "sitting." The location anomaly service 104 accesses one or more probabilistic models 114 and executes the probabilistic model execution unit 124 to compare current non-location data 116 to the probabilistic models 114. When the current non-location data 116 is indicative of a current environment, or state, of the mobile device 102 that has a low probability at the current time then probabilistic model execution unit 124 generates an anomaly indication 126. For example, if the current non-location data 116 is indicative of a "driving" state at 3:00 AM on a Saturday and the probabilistic model 114 indicates a probability of 0.001 for the driving state at that time then the probabilistic model execution unit 124 will generate an anomaly indication 126. However, when the current non-location data 116 is indicative of a current environment, or state, of the mobile device 102 that has a high probability at the current time the probabilistic model execution unit 124 does not indicate an anomaly. For example, if the current non-location data 116 reflects a cell ID for a "home" location of the mobile device 102 and accelerometer data reflects no movement of the mobile device 102 at 3:00 AM on a Saturday this is indicative of a "sleeping" state and if the probabilistic model 114 indicates a probability of 0.97 for the sleeping state at that time then the probabilistic model execution unit 124 will not indicate an anomaly.

Further details on the operation of system 100 are provided below with respect to FIG. 2.

Figure 2:
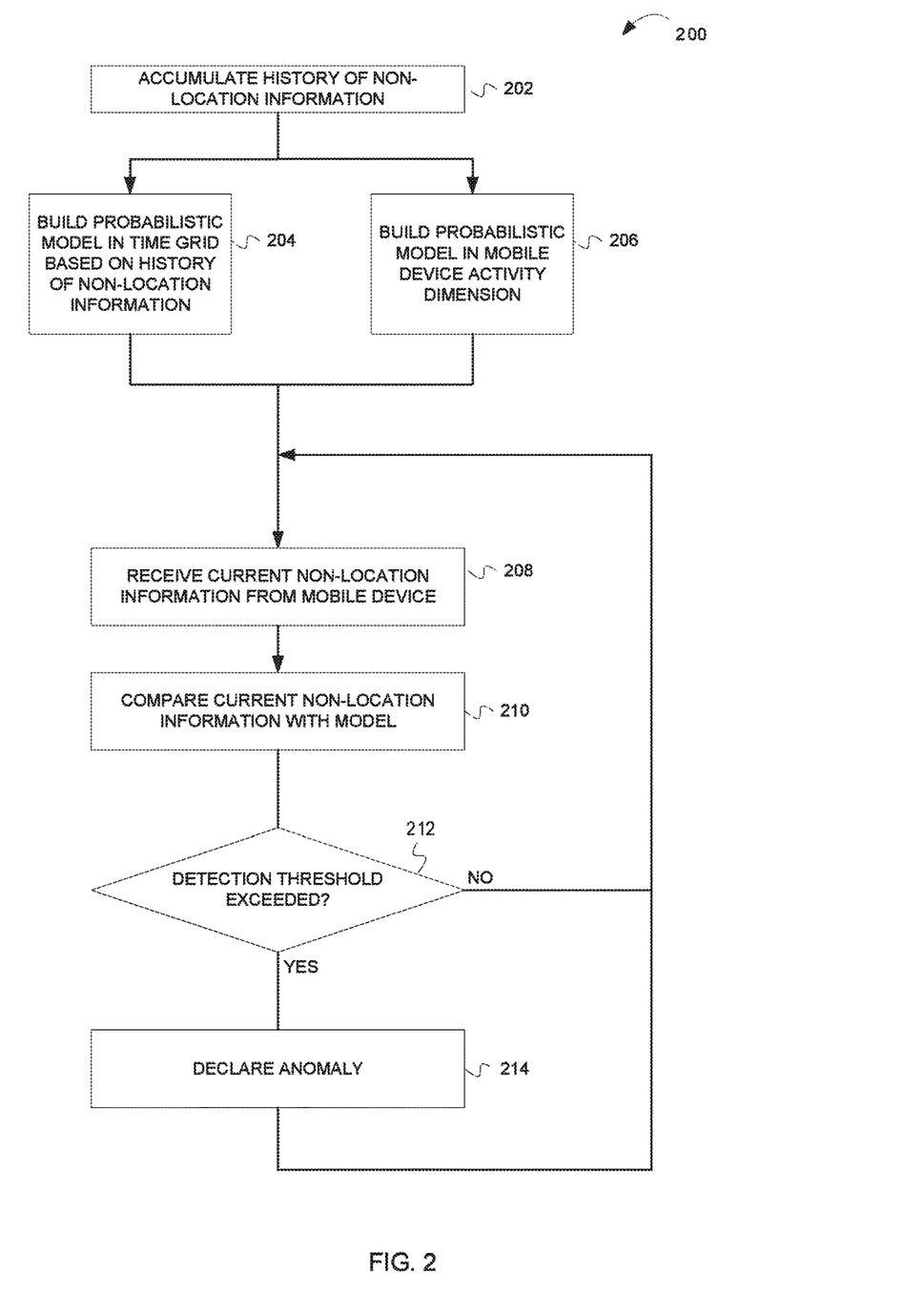
FIG. 2 is a flow chart describing operations of a method to detect location anomalies of mobile devices based on non-location information in accordance with one embodiment of the present invention.

FIG. 2 is a flow chart 200 describing operations of a method to detect location anomalies of mobile devices based on non-location information according to embodiments. The method may, in some aspects, constitute computer programs made up of computer-executable instructions. Describing the method by reference to a flowchart enables one skilled in the art to develop such programs including such instructions to carry out the method on suitable processors (the processor or processors of the computer executing the instructions from computer-readable media). The method illustrated in FIG. 2 is inclusive of acts that may be taken by aspects of the system 100 executing an example embodiment of the invention.

At block 202, the location anomaly service 104 of a system 100 executing the method accumulates a history of non-location information (e.g., historical non-location data 116). As noted above, such information can include various combinations of one or more of:

serving cell identifier.

a signal strength of the serving cell.

an interface type of the serving cell (e.g., LTE, WCDMA, etc.).

neighboring cell identifiers.

signal strengths of the neighboring cells.

interface types of the neighboring cells.

Wi-Fi® and/or Bluetooth® MAC address, SSID and/or RSSI.

raw sensor measurements from magnetometer, gyroscope, accelerometer, light sensor, and/or the like.

image data from a camera, etc.

battery state.

active applications (i.e., foreground applications) executing on a mobile device.

derived status information:

whether the user is driving, walking, or sitting based on gyroscope and/or accelerometer data.

whether the user is indoors or outdoors based on light sensor and/or image data captures from a camera.

The non-location information collected over time can be associated with the mobile device 102 that provided the non-location information. Further, the non-location information can be associated with a time-stamp. The time-stamp can be provided by the mobile device 102 when the mobile device 102 collects the information. Alternatively, the time-stamp can be applied by the location anomaly service 104 when it receives the information from the mobile device 102.

At block 204, the location anomaly service of the system builds a probabilistic model (e.g., probabilistic model 114, model 120, etc.) in a time grid based on the non-location information accumulated at block 202. The non-location data collected at block 202 can be divided into a time grid having uniform or non-uniform grids. For example, in a uniform grid, the blocks of the grid represent the same amount of time (e.g., 9-LOAM, 10-11 AM, 11 AM-12 PM, etc.). The grids can be subdivided by day of week, weekday vs weekend days, school days, holidays, and/or by season, for example.

In non-uniform gridding, the blocks of the time grid can represent different amounts of time (e.g., 10 PM-7 AM, 7-9 AM, 9 AM-12 PM, 12-1 PM, 1-4 PM, etc.) per user and/or per mobile device. In an embodiment, a non-uniform grid can be created by starting with uniform grids, and then splitting or merging grids based on similarity of information in the grids. For example, if adjacent grids have one or more properties with similar values (e.g., the same cell identifier, SSID, etc.), the adjacent blocks can be merged into one block. Similarly, a block that has data with low similarity (e.g., differing cell identifiers, SSIDs, etc.) can be split into multiple blocks. Alternatively, data clustering techniques can be applied to the non-location data received at block 202 to automatically identify clusters, and the identified cluster can be used to form a time grid. The blocks of the grid can contain associations of a probability with elements individually and/or with elements in combination.

After the time grid (either uniform or non-uniform) has been created, a probabilistic distribution of the time grid can be measured. For example, a 10 PM-7 AM block of the time grid may have cell identifier=121 (e.g., a cell identifier near a user's home) at probability=0.95 and cell identifier=333 (e.g., a cell identifier near the user's school) at probability=0.05, indicating that the user, and the user's associated mobile device (e.g., mobile device 102), are more likely to be at home than at school during the hours of 10 PM-7 AM. A 7-9 AM block of the time grid may have a cell identifier=543 at a probability=0.63, and a cell identifier=456 at a probability=0.37, indicating that the user, and the user's associated mobile device, are more likely to be neither at home nor at school during the hours of 7-9 AM. For example, these cell identifiers may indicate the user, and the user's associated mobile device, are traveling between home and school during 7-9 AM. The blocks of the time grid may have other associations of non-location data with probabilities.

At block 206, a probabilistic model in the mobile device activity dimension can be created by the location anomaly service of the system. In this model, information about the applications that are active (e.g., in the foreground) on the mobile device at certain times or derived locations of the mobile device can provide information about the user. A user may use different types of applications at different times of the day or at different derived locations. Examples of different types of applications include:

Social apps (e.g. Facebook, etc.)

Communication apps (e.g. Skype, etc.)

Dating apps (e.g. Tinder, etc.)

Productivity Apps (e.g. work apps: email, calendar, document processing, etc.)

The location anomaly service of the system executing the method can model productivity applications typically used on the mobile device while in the office and dating and social applications that are typically used outside of the office (e.g., at home or at public places). For example, there are many traces on a phone which can indicate whether it is home or office based on probabilistic model. Most prominently, time of day or time of week would be a good indication. For home, typically a stay is during night time and seven days a week and longer during weekend versus for office, typically during day and five days a week. When comparing the time of stay, it becomes very probable which environment is home versus office.

It should be noted that various embodiments may perform (or not perform) the operations of blocks 204 and 206 in different ways. For example, in some embodiments, the operations of block 204 are performed to create a time grid, and the operations of block 206 are not performed. In alternative embodiments, the operations of block 206 may be performed to create a model in the mobile device activity dimension and not perform block 204. In further alternative embodiments, the operations of both blocks 204 and 206 can be performed.

At block 208, a component of the system (e.g., location anomaly service 104, location anomaly notifier app 118, etc.) receives current non-location information (e.g., current non-location data 116) from a mobile device (e.g., mobile device 102). For example, the component of the system can receive one or more of the data items listed above with respect to block 202.

At block 210, the component of the system can compare the current non-location information with the prediction in the model for the mobile device that was created at blocks 204 and/or 206.

At block 212, a check is made by the component of the system to determine if a detection threshold has been exceeded. In some embodiments, the component of the system can check to ensure that a sufficient number of data points have been collected for the model (e.g., the model is based on a sufficient number of accumulated data points). In some embodiments, fifty (50) can be considered a sufficient number of data points.

If a sufficient number of data points have been accumulated for the model, then a check is made by the component of the system to determine if the non-location information is seen so rarely as to be considered an anomaly. For example, if the cell identifier or other non-location information does not exist in the model, or exists at a probability below a predetermined or configurable threshold (e.g., less than 0.01), then at block 214, an anomaly can be determined by the component of the system to have been detected. The component of the system can cause a notification to be presented (i.e., displayed) on a display device (e.g., monitor, etc.).

Otherwise, if a sufficient number of data points have not yet been observed in the model, or if an anomaly is not detected, then flow can return to block 208 to await a next reception of current non-location information.

EXAMPLE SCENARIOS

The following example scenarios are provided to illustrate the operation of the above-described system and methods. The embodiments are not limited to the examples provided below.

Example 1—No Anomaly

Time grid has a 9-12 AM weekday grid having cell identifier=454 with a probability=0.90 and cell identifier=121 with a probability=0.10.

The system receives non-location data indicating a current cell identifier=454 at 10:00 AM, Thursday. This corresponds to the 9-12 AM weekday grid.

No anomaly (this may mean to a parent that "the child is in school")

Example 2—No Anomaly

Last known location=office. An example of how this method can leverage an "old" location information (and not "current" information) is to predict a current location (as in when GPS/location is now off). That is, if a user used GPS two hours ago and turned it off, the old information could be used.

Active app=Excel
Device state=sitting
Battery=8%

No anomaly. In this case, it is likely that the user has switched off location services to conserve battery.

Example 3—Anomaly

Same time grid information as in Example 1.
Currently cell identifier=777 at 11:00 AM, Thursday.
An anomaly is detected because this is a cell never observed before at this time. Thus, something may be wrong (e.g. "child is skipping school")

Example 4—Anomaly

Currently "driving" at 3:00 AM, Saturday.
Time grid has a block 12 AM-6 AM, weekend grid which has activity=sleeping with a probability=0.97, activity=sitting with a probability=0.03, and activity=driving with a probability<0.001.

An anomaly is detected as this is an activity status very rarely observed at this time (e.g. potential medical emergency at night)

Example 5—Anomaly

Current non-location information indicates activity=driving while foreground application is a communication application (e.g., text messaging, snapchat, etc.).

Figure 3:
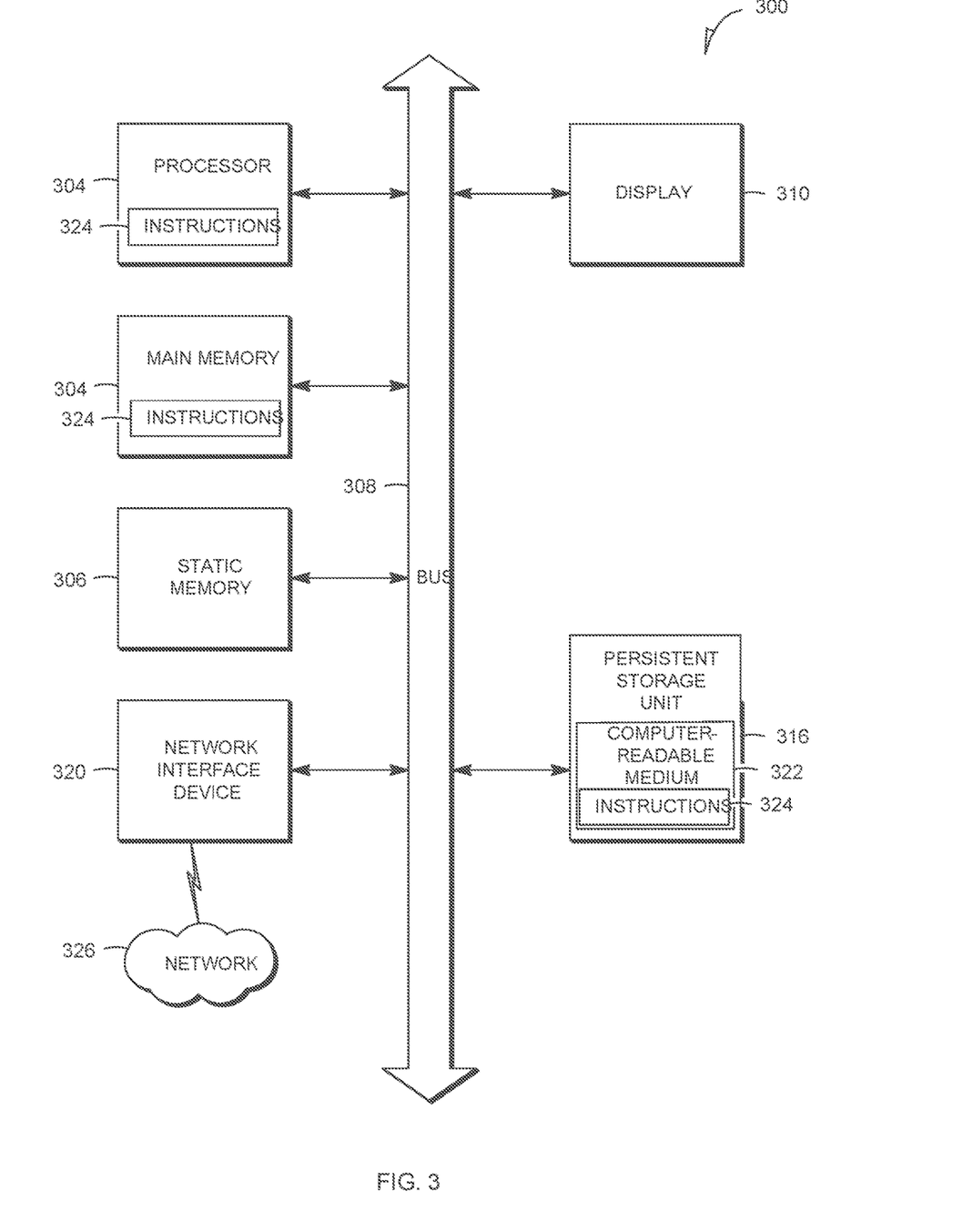
FIG. 3 is a block diagram of an example embodiment of a computer system upon which embodiments of the inventive subject matter can execute in accordance with one embodiment of the present invention.

With reference to FIG. 3, an example embodiment extends to a machine in the example form of a computer system 300 within which instructions for causing the machine to perform any one or more of the methodologies discussed herein may be executed. For example, the computer system 300 may comprise, in whole or in part, aspects of the mobile device 102, a computing device on which location anomaly service 104 is executing, and/or monitor device 106. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example computer system 300 may include a processor 302 (e.g., a central processing unit (CPU), a graphics processing unit (GPU) or both), a main memory 304 and a static memory 306, which communicate with each other via a bus 308. The computer system 300 may further include a display unit 310. In some example embodiments, display unit 310 can be a touchscreen display unit. In example embodiments, the computer system 300 also includes a network interface device 320.

The persistent storage unit 316 includes a machine-readable medium 322 on which is stored one or more sets of instructions 324 and data structures (e.g., software instructions) embodying or used by any one or more of the methodologies or functions described herein. The instructions 324 may also reside, completely or at least partially, within the main memory 304 or within the processor 302 during execution thereof by the computer system 300, the main memory 304 and the processor 302 also constituting machine-readable media.

While the machine-readable medium 322 is shown in an example embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media that can store information in a non-transitory manner, i.e., media that is able to store information. Specific examples of machine-readable storage media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks. A machine-readable storage medium does not include signals.

The instructions 324 may further be transmitted or received over a communications network 326 using a signal transmission medium via the network interface device 320 and utilizing any one of a number of well-known transfer protocols (e.g., FTP, HTTP). Examples of communication networks include a local area network (LAN), a wide area network (WAN), the Internet, mobile telephone networks, Plain Old Telephone (POTS) networks, and wireless data networks (e.g., WiFi and WiMax networks). In an embodiment, communications network 326 corresponds to network 134. The term "machine-readable signal medium" shall be taken to include any transitory intangible medium that is capable of storing, encoding, or carrying instructions for execution by the machine, and includes digital or analog communications signals or other intangible medium to facilitate communication of such software.

In an aspect, a method for detecting an anomalous location of a mobile device (e.g., mobile device 102) includes receiving (e.g., block 202) current non-location information (e.g., current non-location data 116 derived from environment data 110 and/or status data 111) from the mobile device at a current time. In an embodiment, the current non-location information is received by one or more processors (e.g., processor 302) via a network interface (e.g., network interface device 320). The current non-location information does not include location information (e.g., longitude and latitude data, etc.) from the mobile device. The method further includes comparing (e.g., block 210) the current non-location information with a probabilistic model (e.g., probabilistic models 114, model 120, etc.). In an embodiment, the comparison is performed by the one or more processors. The probabilistic model is created (e.g., block 204 and/or block 206) using historical non-location information (e.g., historical non-location data 116 derived from environment data 110 and/or status data 111) for the mobile device from one or more previous times (i.e., before the current time). The historical non-location information does not include location information from the mobile device. Further, the method includes generating (e.g., block 214) a location anomaly indication (e.g., location anomaly indication 126) indicating that the mobile device is in a location that is anomalous at the current time. In an embodiment, the generating is performed by the one or more processors. The location anomaly indication is generated in response to determining (e.g., block 212), based on the comparison, that the current non-location information is indicative of a location of the mobile device having a probability at the current time less than a threshold probability.

In some embodiments, generating the location anomaly indication includes generating the location anomaly indication in response to determining, based on the comparison, that the current non-location information is not predicted by the probabilistic model. In some embodiments, the current non-location information and the historical non-location information includes one or more elements selected from the group consisting of a serving cell identifier, a signal strength, an interface type, a neighboring cell identifier, a MAC address, an SSID, an RSSI, a sensor measurement from an auxiliary device of the mobile device, image data from a camera of the mobile device, an active application on the mobile device, and a derived status element. In some embodiments, the probabilistic model comprises a time grid. In additional or alternative embodiments, the probabilistic model comprises a grid of activity of the mobile device.

In further embodiments, the probabilistic model comprises a set of one or more possible locations of the mobile device and a probability for each possible location that the mobile device is in the possible location at the current time. In some embodiments, the probabilistic model is created from the historical non-location information for the mobile device by a machine-learning modeler (e.g., machine-learning modeler 112). In some embodiments, the method further includes displaying a notification of the location anomaly indication on a display device (e.g., display unit 310). In further embodiments, the method includes transmitting, by the one or more processors via the network interface, a notification of the location anomaly indication to a location anomaly notifier application (e.g., location anomaly notifier app 118) executing on a monitor device (e.g., monitor device 106).

In another aspect, a system includes a network interface (e.g., network interface device 320), at least one processor (e.g., processor 302), and at least one non-transitory computer-readable storage medium (e.g., main memory 304) connected by a bus (e.g., bus 308). The network interface is configured to communicatively connect the system to a network (e.g., network 134). The at least one non-transitory computer-readable storage medium stores one or more processor-executable instructions (e.g., instructions 324) that, when executed by the at least one processor, provide a location anomaly service (e.g., location anomaly service 104). The location anomaly service is configured to receive (e.g., block 202) current non-location information (e.g., current non-location data 116 derived from environment data 110 and/or status data 111) from the mobile device at a current time. In an embodiment, the current non-location information is received by the at least one processor via the network interface. The current non-location information does not include location information (e.g., longitude and latitude data, etc.) from the mobile device. The location anomaly service is also configured to compare (e.g., block 210) the current non-location information with a probabilistic model (e.g., probabilistic models 114, model 120, etc.). In an embodiment, the comparison is performed by the at least one processor. The probabilistic model is created (e.g., block 204 and/or block 206) using historical non-location information (e.g., historical non-location data 116 derived from environment data 110 and/or status data 111) for the mobile device from one or more previous times (i.e., before the current time). The historical non-location information does not include location information from the mobile device. The location anomaly service is further configured to generate (e.g., block 214) a location anomaly indication (e.g., location anomaly indication 126) indicating that the mobile device is in a location that is anomalous at the current time. In an embodiment, the generating is performed by the at least one processor. The location anomaly indication is generated in response to determining (e.g., block 212), based on the comparison, that the current non-location information is indicative of a location of the mobile device having a probability at the current time less than a threshold probability.

In yet another aspect, a non-transitory computer readable storage medium (e.g., machine-readable medium 322) includes a set of instructions (e.g., instructions 324) executable by a computer for detecting an anomalous location of a mobile device (e.g., mobile device 102). The non-transitory computer readable storage medium includes instructions for receiving (e.g., block 202) current non-location information (e.g., current non-location data 116 derived from environment data 110 and/or status data 111) from the mobile device at a current time. In an embodiment, the current non-location information is received via a network interface (e.g., network interface device 320). The current non-location information does not include location information (e.g., longitude and latitude data, etc.) from the mobile device. The non-transitory computer readable storage medium also includes instructions for comparing (e.g., block 210) the current non-location information with a probabilistic model (e.g., probabilistic models 114, model 120, etc.). The probabilistic model is created (e.g., block 204 and/or block 206) by a machine-learning modeler (e.g., machine-learning modeler 112) using historical non-location information (e.g., historical non-location data 116 derived from environment data 110 and/or status data 111) for the mobile device from one or more previous times (i.e., before the current time). The historical non-location information does not include location information from the mobile device. The non-transitory computer readable storage medium further includes instructions for generating (e.g., block 214) a location anomaly indication (e.g., location anomaly indication 126) indicating that the mobile device is in a location that is anomalous at the current time. The location anomaly indication is generated in response to determining (e.g., block 212), based on the comparison, that the current non-location information is indicative of a location of the mobile device having a probability at the current time less than a threshold probability. The non-transitory computer readable storage medium can also include instructions for generating a display for displaying a notification of the location anomaly indication on a display device (e.g., display unit 310). The non-transitory computer readable storage medium can further include instructions for transmitting, via the network interface, a notification of the location anomaly indication to a location anomaly notifier application (e.g., location anomaly notifier app 118) executing on a monitor device (e.g., monitor device 106).

Although an overview of the inventive subject matter has been described with reference to specific example embodiments, various modifications and changes may be made to these embodiments without departing from the broader scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

As is evident from the foregoing description, certain aspects of the inventive subject matter are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the inventive subject matter. Therefore, it is manifestly intended that this inventive subject matter be limited only by the following claims and equivalents thereof.

The Abstract is provided to comply with 37 C.F.R. § 1.72(b) to allow the reader to quickly ascertain the nature and gist of the technical disclosure. The Abstract is submitted with the understanding that it will not be used to limit the scope of the claims.

What is claimed is:

1. A method for detecting an anomalous location of a mobile device, the method comprising:
   receiving, by one or more processors via a network interface, current non-location information from the mobile device at a current time, wherein the current non-location information does not include location information from the mobile device;
   comparing, by the one or more processors, the current non-location information with a probabilistic model, wherein the probabilistic model is created using historical non-location information for the mobile device, wherein the historical non-location information does not include location information from the mobile device; and
   generating, by the one or more processors, a location anomaly indication indicating that the mobile device is in a location that is anomalous at the current time in response to determining, based on the comparison, that the current non-location information is indicative of a location of the mobile device having a probability at the current time less than a threshold probability.

2. The method of claim 1, wherein said generating the location anomaly indication includes generating the location anomaly indication in response to determining, based on the comparison, that the current non-location information is not predicted by the probabilistic model.

3. The method of claim 1, wherein the current non-location information and the historical non-location information includes one or more elements selected from the group consisting of a serving cell identifier, a signal strength, an interface type, a neighboring cell identifier, a MAC address, an SSID, an RSSI, a sensor measurement from an auxiliary device of the mobile device, image data from a camera of the mobile device, an active application on the mobile device, and a derived status element.

4. The method of claim 1, wherein the probabilistic model comprises a time grid.

5. The method of claim 1, wherein the probabilistic model comprises a grid of activity of the mobile device.

6. The method of claim 1, wherein the probabilistic model comprises a set of one or more possible locations of the mobile device and a probability for each possible location that the mobile device is in the possible location at the current time.

7. The method of claim 1, wherein the probabilistic model is created from the historical non-location information for the mobile device by a machine-learning modeler.

8. The method of claim 1, further comprising displaying a notification of the location anomaly indication on a display device.

9. The method of claim 1, further comprising transmitting, by the one or more processors via the network interface, a notification of the location anomaly indication to a location anomaly notifier application executing on a monitor device.

10. A system for detecting an anomalous location of a mobile device, the system comprising:
    a network interface configured to communicatively connect the system to a network;
    at least one processor connected to the network interface by a bus; and
    at least one non-transitory computer-readable storage medium connected to the network interface and the at least one processor by the bus,
    wherein the at least one non-transitory computer-readable storage medium stores one or more processor-executable instructions that, when executed by the at least one processor, provide a location anomaly service configured to:
    receive current non-location information from the mobile device at a current time, wherein the current non-location information does not include location information from the mobile device;
    compare the current non-location information with a probabilistic model, wherein the probabilistic model is created using historical non-location information for the mobile device, wherein the historical non-location information does not include location information from the mobile device; and
    generate a location anomaly indication indicating that the mobile device is in a location that is anomalous at the current time in response to determining, based on the comparison, that the current non-location information is indicative of a location of the mobile device having a probability at the current time less than a threshold probability.

11. The system of claim 10, wherein the location anomaly service is configured to generate the location anomaly indication in response to determining, based on the comparison, that the current non-location information is not predicted by the probabilistic model.

12. The system of claim 10, wherein the current non-location information and the historical non-location information includes one or more elements selected from the group consisting of a serving cell identifier, a signal strength, an interface type, a neighboring cell identifier, a MAC address, an SSID, an RSSI, a sensor measurement from an auxiliary device of the mobile device, image data from a camera of the mobile device, an active application on the mobile device, and a derived status element.

13. The system of claim 10, wherein the probabilistic model comprises a time grid.

14. The system of claim 10, wherein the probabilistic model comprises a grid of activity of the mobile device.

15. The system of claim 10, wherein the probabilistic model comprises a set of one or more possible locations of the mobile device and a probability for each possible location that the mobile device is in the possible location at the current time.

16. The system of claim 10, wherein the probabilistic model is created from the historical non-location information for the mobile device by a machine-learning modeler.

17. The system of claim 10, wherein the location anomaly service is further configured to generate a display for displaying a notification of the location anomaly indication on a display device.

18. The system of claim 10, wherein the location anomaly service is further configured to transmit, via the network interface, a notification of the location anomaly indication to a location anomaly notifier application executing on a monitor device.

19. A non-transitory computer readable storage medium comprising a set of instructions executable by a computer for detecting an anomalous location of a mobile device, the non-transitory computer readable storage medium comprising:
instructions for receiving, via a network interface, current non-location information from the mobile device at a current time, wherein the current non-location information does not include location information from the mobile device;
instructions for comparing the current non-location information with a probabilistic model, wherein the probabilistic model is created by a machine-learning modeler using historical non-location information for the mobile device, wherein the historical non-location information does not include location information from the mobile device;
instructions for generating a location anomaly indication indicating that the mobile device is in a location that is anomalous at the current time in response to determining, based on the comparison, that the current non-location information is indicative of a location of the mobile device having a probability at the current time less than a threshold probability;
instructions for generating a display for displaying a notification of the location anomaly indication on a display device; and
instructions for transmitting, via the network interface, the notification of the location anomaly indication to a location anomaly notifier application executing on a monitor device.

20. The non-transitory computer readable storage medium of claim 19, wherein the current non-location information and the historical non-location information includes one or more elements selected from the group consisting of a serving cell identifier, a signal strength, an interface type, a neighboring cell identifier, a MAC address, an SSID, an RSSI, a sensor measurement from an auxiliary device of the mobile device, image data from a camera of the mobile device, an active application on the mobile device, and a derived status element.

* * * * *

UNITED STATES PATENT AND TRADEMARK OFFICE
CERTIFICATE OF CORRECTION

PATENT NO. : 10,448,356 B1
APPLICATION NO. : 16/370958
DATED : October 15, 2019
INVENTOR(S) : Juyong Do, Rajarshi Gupta and Leo H. Kwong

Page 1 of 1

It is certified that error appears in the above-identified patent and that said Letters Patent is hereby corrected as shown below:

On the Title Page (73) Assignee should read: AVAST SOFTWARE S.R.O., Prague (CZ)

Signed and Sealed this
Seventeenth Day of March, 2020

Andrei Iancu
*Director of the United States Patent and Trademark Office*